United States Patent
Nyren

(10) Patent No.: US 8,613,183 B2
(45) Date of Patent: Dec. 24, 2013

(54) MANDREL FOR APPLYING AND CUTTING SHRINK SLEEVE MATERIAL TO CONTAINERS

(75) Inventor: Kenneth F. Nyren, Raleigh, NC (US)

(73) Assignee: Axon LLC, Raleigh, NC (US)

( * ) Notice: Subject to any disclaimer, the term of this patent is extended or adjusted under 35 U.S.C. 154(b) by 683 days.

(21) Appl. No.: 12/835,078

(22) Filed: Jul. 13, 2010

(65) Prior Publication Data

US 2012/0011811 A1   Jan. 19, 2012

(51) Int. Cl.
 *B65B 41/00* (2006.01)
(52) U.S. Cl.
 USPC ............ 53/585; 53/389.3; 493/227; 493/239; 493/288; 493/250

(58) Field of Classification Search
 USPC ............. 53/585, 389.1, 389.3, 580, 581, 203; 493/227, 239–242, 287–290, 365, 367, 493/371, 380, 250; 30/292, 103–108
 See application file for complete search history.

(56) References Cited

U.S. PATENT DOCUMENTS

| 5,531,858 | A | 7/1996 | Hong |
| 7,398,811 | B1 | 7/2008 | Duncan et al. |
| 7,562,611 | B2 | 7/2009 | Chen |
| 2010/0037556 | A1 * | 2/2010 | Fresnel ........................ 53/218 |

* cited by examiner

*Primary Examiner* — Alexandra Elve
*Assistant Examiner* — Adam Moon
(74) *Attorney, Agent, or Firm* — Thompson Hine LLP

(57) ABSTRACT

A mandrel assembly for use in shrink sleeve labeler machines includes a replaceable insert having a cutting slot that is spaced apart from both upper and lower elements of the mandrel assembly.

18 Claims, 4 Drawing Sheets

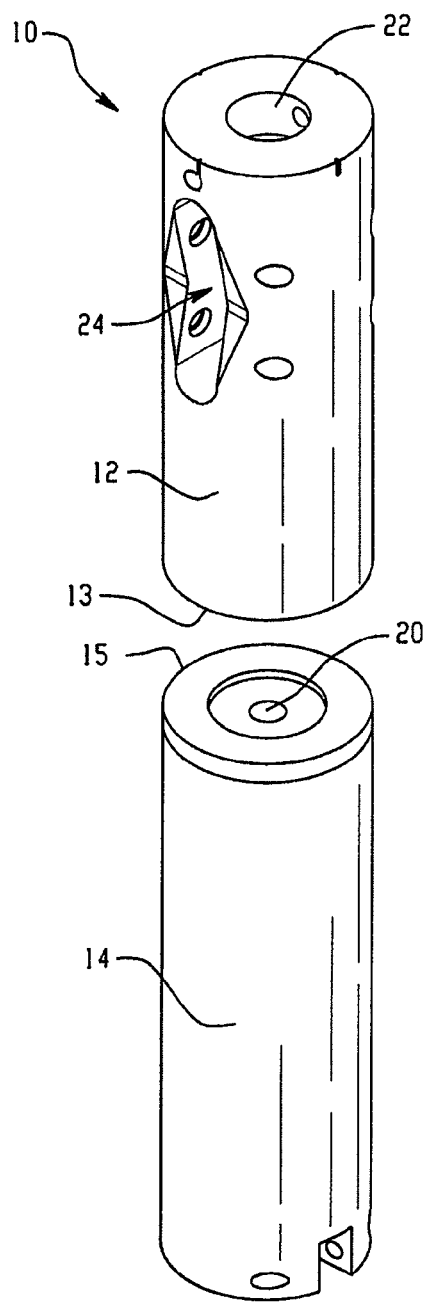
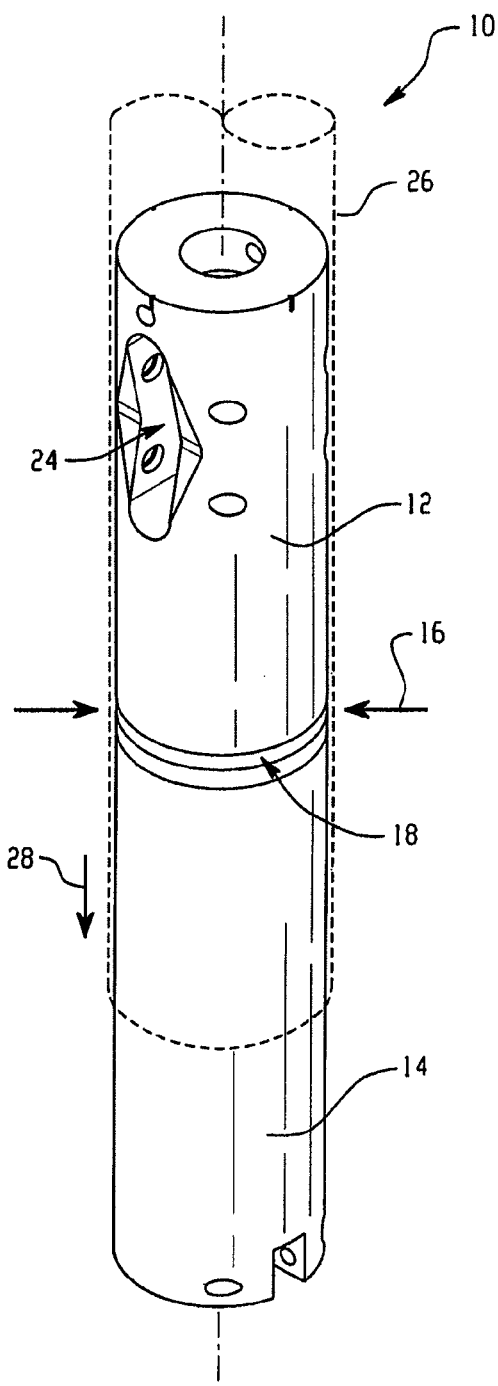
Fig. 1a
PRIOR ART
Fig. 1b
PRIOR ART

MANDREL FOR APPLYING AND CUTTING SHRINK SLEEVE MATERIAL TO CONTAINERS

TECHNICAL FIELD

The present application relates generally to apparatus for applying shrink sleeve material to containers and, more particularly, to an improved shrink sleeve mandrel for use in such apparatus.

BACKGROUND

Cutting mechanisms are frequently used with shrink sleeve labeler machines. Specifically, in shrink sleeve labeler machines, tubular film is fed into a sleeve application chamber, where the film passes through a series of guide rollers over a mandrel that opens the tubular film. When a detection photoeye senses the container (e.g., passing beneath the mandrel), blade(s) located in close proximity to the mandrel cut the film, which is then advanced down the mandrel by the following label. Finally, the cut sleeve is pushed down onto the container by film-application rollers located at the base of the mandrel.

In such prior art devices, a two-piece mandrel has been utilized having an upper portion and a lower portion with a cutting slot formed by the interconnection of the two portions. While this approach has been effective for cutting film, the blade can damage the ends of both mandrel portions, such that both will periodically need to be replaced.

Accordingly, it would be desirable and advantageous to provide an improved mandrel assembly.

SUMMARY

In one aspect of the present invention, a shrink sleeve mandrel assembly includes a replaceable cutting insert that, by itself, defines a cutting slot or groove to facilitate film cutting.

The mandrel assembly includes upper and lower mandrel elements. A generally cylindrical cutting insert is provided for removable and replaceable affixation between the upper and lower mandrel elements. The cutting insert includes a cutting slot that is defined entirely by the insert so that the upper and lower elements are located in positions where damage from the cutting knife can be minimized.

In such preferred embodiments, the cutting knife(s) or blade(s) will be mounted about the periphery of the mandrel assembly such that, during a cutting operation of the tubular film passing along the assembly, the knife(s) or blades(s) are moved and will extend partially into the cutting slot of the replaceable cutting insert so as to assure complete cutting of the tubular film.

BRIEF DESCRIPTION OF DRAWING

FIGS. 1a and 1b are schematic drawings of the prior art two-piece mandrel assembly;

DETAILED DESCRIPTION

Figure 2A:
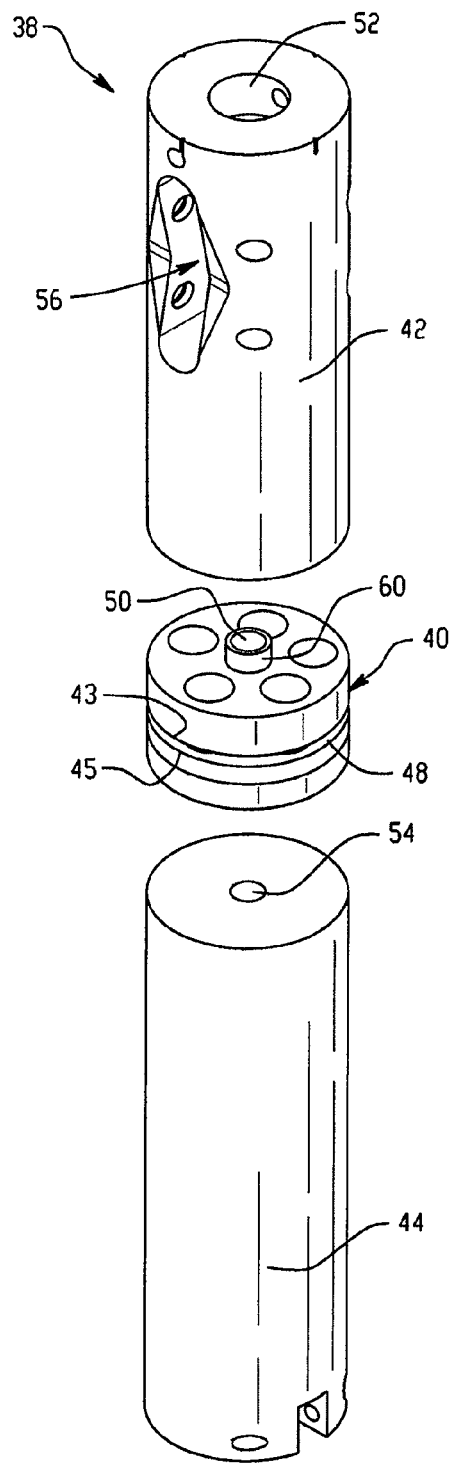
FIGS. 2a and 2b are schematic drawings of an embodiment of a three-piece mandrel assembly with insert.

Referring to FIGS. 1a and 1b, the prior art two-piece mandrel 10 is formed by upper cylindrical element 12 and lower cylindrical element 14. Peripheral blade 16 (shown schematically by arrows) is disposed in axial alignment with cutting groove 18 that is defined by the lower edge of upper cylindrical element 12 and the upper edge of lower cylindrical element 14. The two elements 12 and 14 are connected together via a bolt (not shown) that passes through axial apertures 20 and 22 of the elements. Upper cylindrical element 12 includes diametrically opposed sleeve drive slots 24 into which sleeve drive rollers can be mounted to aid in moving a tubular sleeve 26 axially downward along the mandrel assembly in travel direction 28. Operation of peripheral blade 16 can damage the slot edges (upper edge 13 and lower edge 15) and therefore damage both elements 12 and 14. As a result, both elements 12 and 14 must periodically be replaced.

Figure 2B:
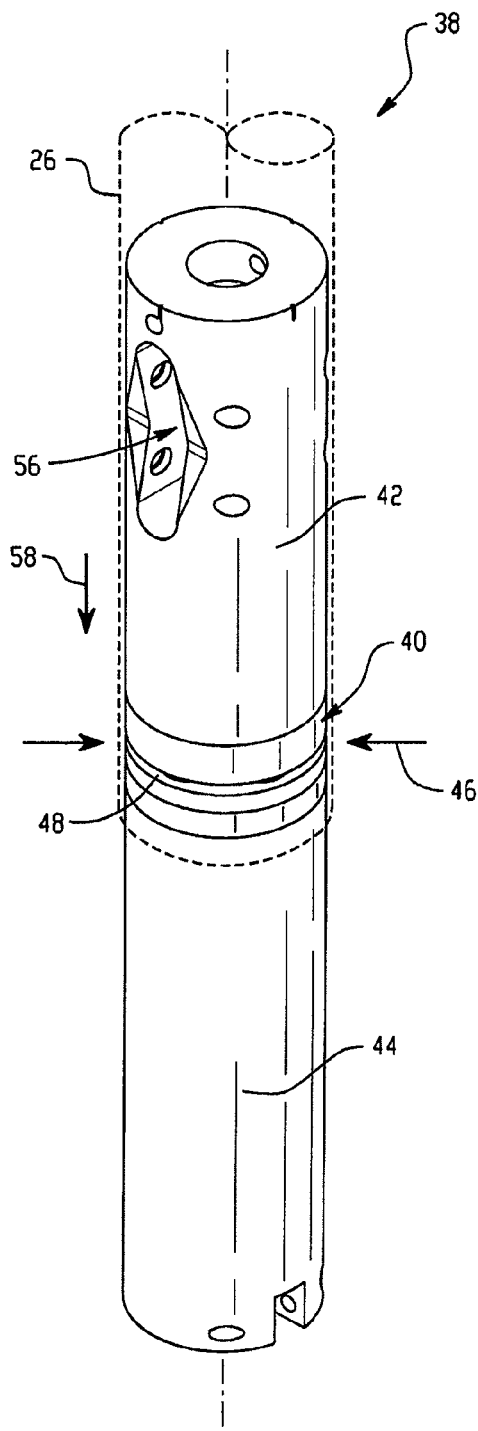

Referring to FIGS. 2a and 2b, the novel mandrel assembly 38 of the present invention for applying and cutting shrink sleeve material to containers is formed by upper cylindrical element 42, lower cylindrical element 44, and cutting insert 40. A peripheral blade 46 (shown schematically by arrows) is disposed in axial alignment with a cutting groove 48, which extends radially inward from the external surface of the cutting insert 40. By way of example, the peripheral cutting blade 46 may take the form of the cutting blades shown and described in U.S. Pat. No. 5,531,858 or U.S. Pat. No. 7,562,611, the entirety of each of which is incorporated herein by reference. Cutting groove 48 is defined by upper edge 43 and lower edge 45, both of which are spaced apart from the top and bottom edges of the insert. Accordingly, upper cylindrical element 42 and lower cylindrical element 44 are spaced apart from the cutting groove 48 and peripheral blade 46 to avoid contact with the blade 46 during sleeve cutting operations.

Upper cylindrical element 42, lower cylindrical element 44, and cutting insert 40 are operatively connected via a bolt (not shown) that passes through post aperture 50, axial aperture 52 of upper cylindrical element 42 and axial aperture 54 of lower cylindrical element 44. Upper cylindrical element 42 includes diametrically opposed sleeve drive slots 56 into which sleeve drive rollers can be mounted to aid in moving the tubular sleeve 26 axially downward along the mandrel assembly in a travel direction 58.

Cutting insert 40 is defined by two cylindrically-shaped, disc-like elements or portions, connected by a central cylinder-shaped member. A post 60 extends upward from the upper mounting surface of the upper disc part of the cutting insert and engages in a lower opening of the upper element 42 for added stability in the interconnection of the two components. A similar post 62 extends downward from the lower mounting surface of the lower disc part of the cutting insert and engages into an upper opening of the lower element 44.

In use, tubular film is fed into a sleeve application chamber, where the film passes through a series of guide rollers over three-piece mandrel 38 that opens the tubular film. When a detection photoeye senses the container (e.g., passing beneath three-piece mandrel 38), peripheral blade 46 located in close proximity to three-piece mandrel 38 cuts the film, which is then advanced down three-piece mandrel 38 by the following label. Finally, the cut portion of the sleeve 26 is pushed down onto container (not shown) by film application rollers (not shown) located at the base of three-piece mandrel assembly 38. Operation of peripheral blade 46 can damage the slot edges of cutting groove 48, but will not damage the elements 42 or 44.

When damage and/or wear occurs to upper edge 43 and/or lower edge 45 of cutting groove 48, replacement of cutting insert 40 is necessary. The user removes cutting insert 40 from three-piece mandrel 38. More specifically, three-piece mandrel 38 is separated from the shrink sleeve labeler machine, and cutting insert 40 is removed from three-piece mandrel 38 by removing the bolt (not shown) to enable separation of the components. A new cutting insert 40 is introduced into three-piece mandrel assembly 38.

Figure 3A:
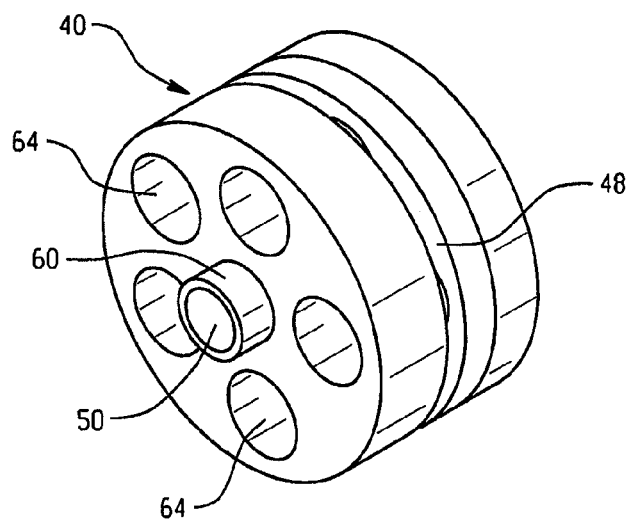
FIGS. 3a, 3b, and 3c are schematic drawings of a perspective view, an end view and a side view of the insert of FIGS. 2a and 2b.
Figures 3B, 3C:
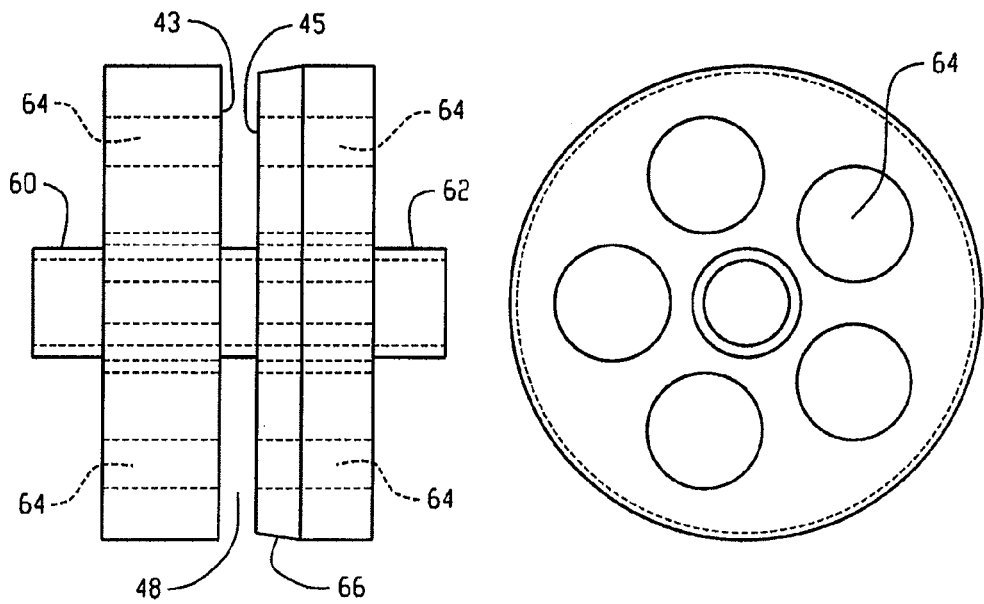

Referring now to FIGS. 3*a*, 3*b*, and 3*c*, enlarged views of a preferred embodiment of cutting insert 40 of the present invention are shown. Axially extending and circumferentially spaced passages 64 are provided in both the upper and lower disc portions of the insert 40 for savings of material. As best seen in FIG. 3*b*, a taper 66 is provided and runs from the lower edge 45 downward (to the right in FIG. 3*b*) and outward to the final radius defined by the external surface of the lower disc part. The taper 66 facilitates passage of the cut sleeve edge downward along the mandrel assembly without getting caught up on the lower edge 45.

In one implementation the cutting insert 40 may be formed as a unitary piece using a 3-D polymer printing technology such as that of Objet Geometries Ltd. However, other technologies could be used (e.g., molding or machining) to form the insert and the insert could be formed from multiple pieces that are connected together (e.g., an upper disc and a lower disc). In one embodiment, the cutting insert 40 is sized such that its axial length (i.e., length along an axis aligned with the sleeve movement direction 58) from the upper mounting surface to the lower mounting surface (i.e., not inclusive of the posts 60 and 62) is no more than about one-fifth (e.g., one-sixth or less) of the overall axial length of the three-piece mandrel assembly.

Figure 4:
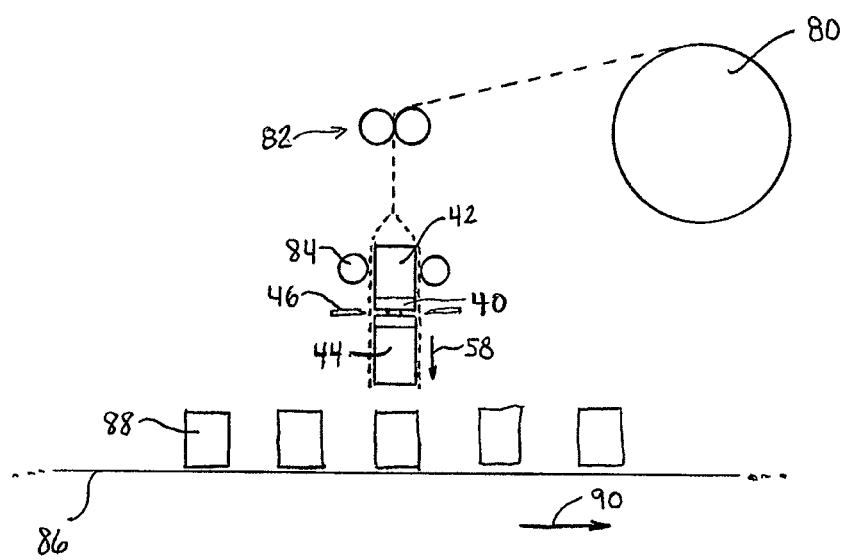
FIG. 4 is a schematic depiction of a tubular shrink sleeve applying apparatus incorporating the mandrel assembly of FIGS. 2a and 2b.

Referring now to FIG. 4, the mandrel assembly is shown installed in a tubular shrink sleeve applying apparatus that includes a roll or other supply of tubular film that deliver the film to a pair of tubular film drivers 82 located above the mandrel assembly for moving the film down toward the mandrel assembly. Although not shown, the top of the mandrel assembly may be shaped to cause the tube to spread from its flat orientation to its cylindrical orientation. Sleeve drivers 84 operate in coordination with drivers 82 and interact with rollers in the sleeve drive slots to move the tubular film downward along the mandrel assembly. A container conveyance mechanism 86 passes beneath the mandrel assembly and carries containers 88 in a conveyance direction 90 such that cut sleeves are moved off the mandrel assembly and onto the containers passing thereby. A downstream application of heat can then be used to shrink the film.

Although the invention has been described and illustrated in detail, it is to be clearly understood that the same is intended by way of illustration and example only, and is not intended to be taken by way of limitation. For example, in some implementations, the insert, upper cylindrical segment, and lower cylindrical segment can be disposed in various alternative shapes and configurations. Thus, it is recognized that numerous other variations exist, including both narrowing and broadening variations of the appended claims.

What is claimed is:

1. A machine for applying shrinkable tubular film to products, the machine comprising:
    a mandrel assembly including:
        an upper element, a lower element and a cutting insert, the cutting insert disposed axially between the upper element and the lower element and connected for removable and replaceable affixation to the upper and lower elements, the cutting insert having an upper mounting surface and lower mounting surface disposed on opposite ends of the cutting insert body, and an external surface having an inwardly extending peripheral cutting slot that is spaced from both the upper mounting surface and the lower mounting surface;
    a supply of tubular film arranged to feed onto the mandrel assembly.

2. The machine of claim 1, wherein the upper element and the lower element are cylindrically shaped.

3. The machine of claim 1, wherein the cutting insert comprises an upper disc-shaped part and a lower disc-shaped part separated by the cutting slot and connected by a central cylindrical member.

4. The machine of claim 1, wherein the cutting slot comprises an upper edge and a lower edge, the upper edge spaced below the upper mounting surface and the lower edge spaced above the lower mounting surface.

5. The machine of claim 4, wherein a taper extends downward and outward from the lower edge.

6. The machine of claim 3, wherein each of the disc-shaped parts of the cutting insert has a plurality of axially extending passages.

7. The machine of claim 6, wherein the axially extending passages of the upper disc-shaped part align with the axially extending passages of the lower disc-shaped part.

8. The machine of claim 3 wherein the upper disc-shaped part includes a post member extending upwardly therefrom and positioned with a lower opening of the upper element, and the lower disc-shaped part includes a post member extending downwardly therefrom and positioned with an upper opening of the lower element.

9. The machine of claim 1 wherein an axial length of the cutting insert from the upper mounting surface to the lower mounting surface is no more than one-fifth of an axial length of the mandrel assembly.

10. The machine of claim 1 further comprising:
    a container conveyance mechanism passing beneath a lower end of the mandrel assembly; and
    a film cutter aligned with the peripheral cutting slot of the mandrel assembly.

11. A machine for applying shrinkable tubular film to products, the machine comprising:
    a mandrel assembly including an upper cylindrical element, a lower cylindrical element and a cutting insert coupled together to form an elongated mandrel, the cutting insert disposed axially between the upper cylindrical element and the lower cylindrical element and connected for removable and replaceable affixation between the upper and lower cylindrical elements, the cutting insert having an inwardly extending peripheral cutting slot that is spaced from both the upper cylindrical element and the lower cylindrical element;
    a supply of tubular film arranged to feed downward onto and about a top end of the mandrel assembly;
    a container conveyance mechanism passing beneath a lower end of the mandrel assembly; and
    a film cutter aligned with the peripheral cutting slot of the mandrel assembly and operable to cut the tubular film into lengths to be fed onto containers traveling on the container conveyance mechanism.

12. The machine of claim 11, wherein the cutting insert comprises an upper disc-shaped part and a lower disc-shaped part separated by the cutting slot and connected by a central cylindrical member.

13. The machine of claim 12, wherein the cutting slot comprises an upper edge and a lower edge.

14. The machine of claim 13, wherein a taper extends downward and outward from the lower edge.

15. The machine of claim 12, wherein each of the disc-shaped parts of the cutting insert has a plurality of axially extending passages.

16. The machine of claim 15, wherein the axially extending passages of the upper disc-shaped part align with the axially extending passages of the lower disc-shaped part.

17. The machine of claim 16 wherein the upper disc-shaped part includes a post member extending upwardly therefrom and positioned with a lower opening of the upper cylindrical element, and the lower disc-shaped part includes a post member extending downwardly therefrom and positioned with an upper opening of the lower cylindrical element.

18. The machine of claim 11 wherein an axial length of the cutting insert from the upper mounting surface to the lower mounting surface is no more than one-fifth of an axial length of the mandrel assembly.

* * * * *